US009337968B2

(12) United States Patent
Deguchi

(10) Patent No.: US 9,337,968 B2
(45) Date of Patent: *May 10, 2016

(54) WIRELESS COMMUNICATION APPARATUS, WIRELESS COMMUNICATION SYSTEM, AND TRANSMISSION METHOD

(71) Applicant: KABUSHIKI KAISHA TOSHIBA, Minato-ku, Tokyo (JP)

(72) Inventor: Noritaka Deguchi, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 13/775,881

(22) Filed: Feb. 25, 2013

(65) Prior Publication Data

US 2013/0163402 A1 Jun. 27, 2013

Related U.S. Application Data

(63) Continuation of application No. 12/956,579, filed on Nov. 30, 2010, now Pat. No. 8,406,327, which is a continuation of application No. 11/827,557, filed on Jul. 12, 2007, now Pat. No. 7,869,531.

(30) Foreign Application Priority Data

Jul. 27, 2006 (JP) .................................. 2006-205088

(51) Int. Cl.
| | |
|---|---|
| *H04K 1/10* | (2006.01) |
| *H04L 27/28* | (2006.01) |
| *H04L 5/00* | (2006.01) |
| *H04J 4/00* | (2006.01) |
| *H04L 25/03* | (2006.01) |
| *H04L 27/26* | (2006.01) |

(52) U.S. Cl.
CPC ................. *H04L 5/0016* (2013.01); *H04J 4/00* (2013.01); *H04L 25/03866* (2013.01); *H04L 27/2602* (2013.01)

(58) Field of Classification Search
CPC ..................... H04B 1/707; H04B 2201/70706; H04J 13/10; H04J 13/0022; H04J 13/0048; H04J 13/12; H04J 13/00; H04L 27/2647; H04L 5/0007; H04L 27/2657; H04L 27/2662; H04L 5/0048; H04L 1/0003; H04L 1/0071; H04L 1/0009; H04L 27/0008; H04L 5/0016; H04L 25/03866; H04L 27/2602
USPC ................... 375/260, 140, 146, 295; 370/208
See application file for complete search history.

(56) References Cited

U.S. PATENT DOCUMENTS

| | | | |
|---|---|---|---|
| 7,418,042 B2 | 8/2008 | Choi et al. | |
| 7,869,531 B2 * | 1/2011 | Deguchi | ........................ 375/260 |

(Continued)

FOREIGN PATENT DOCUMENTS

| | | |
|---|---|---|
| JP | 2002-204217 | 7/2002 |
| WO | 2004/021616 | 3/2004 |

OTHER PUBLICATIONS

Search report dated Aug. 19, 2008 from corresponding JP Application No. 2006-205088.

*Primary Examiner* — Phuong Phu
(74) *Attorney, Agent, or Firm* — Foley & Lardner LLP

(57) ABSTRACT

A wireless communication apparatus (a) generates a transmission symbol; (b) assigns, to the transmission symbol, a given number of units each formed of a symbol and a subcarrier in a frame which is formed of M (M is a positive integer) symbols and N (N is a positive integer) subcarriers and includes M×N units, and the given number being not more than M×N, to obtain the given number of identical transmission symbols; (c) multiplies the identical transmission symbols by a code sequence including a plurality of different elements; and (d) transmits the identical transmission symbols multiplied by the code sequence.

13 Claims, 13 Drawing Sheets

(56) References Cited

U.S. PATENT DOCUMENTS

| | | | |
|---|---|---|---|
| 8,406,327 B2* | 3/2013 | Deguchi | 375/260 |
| 2003/0053413 A1 | 3/2003 | Sawahashi et al. | |
| 2003/0081538 A1 | 5/2003 | Walton et al. | |
| 2006/0245472 A1* | 11/2006 | Pan et al. | 375/144 |
| 2006/0274638 A1 | 12/2006 | Walton et al. | |
| 2007/0253321 A1 | 11/2007 | Akita et al. | |

* cited by examiner

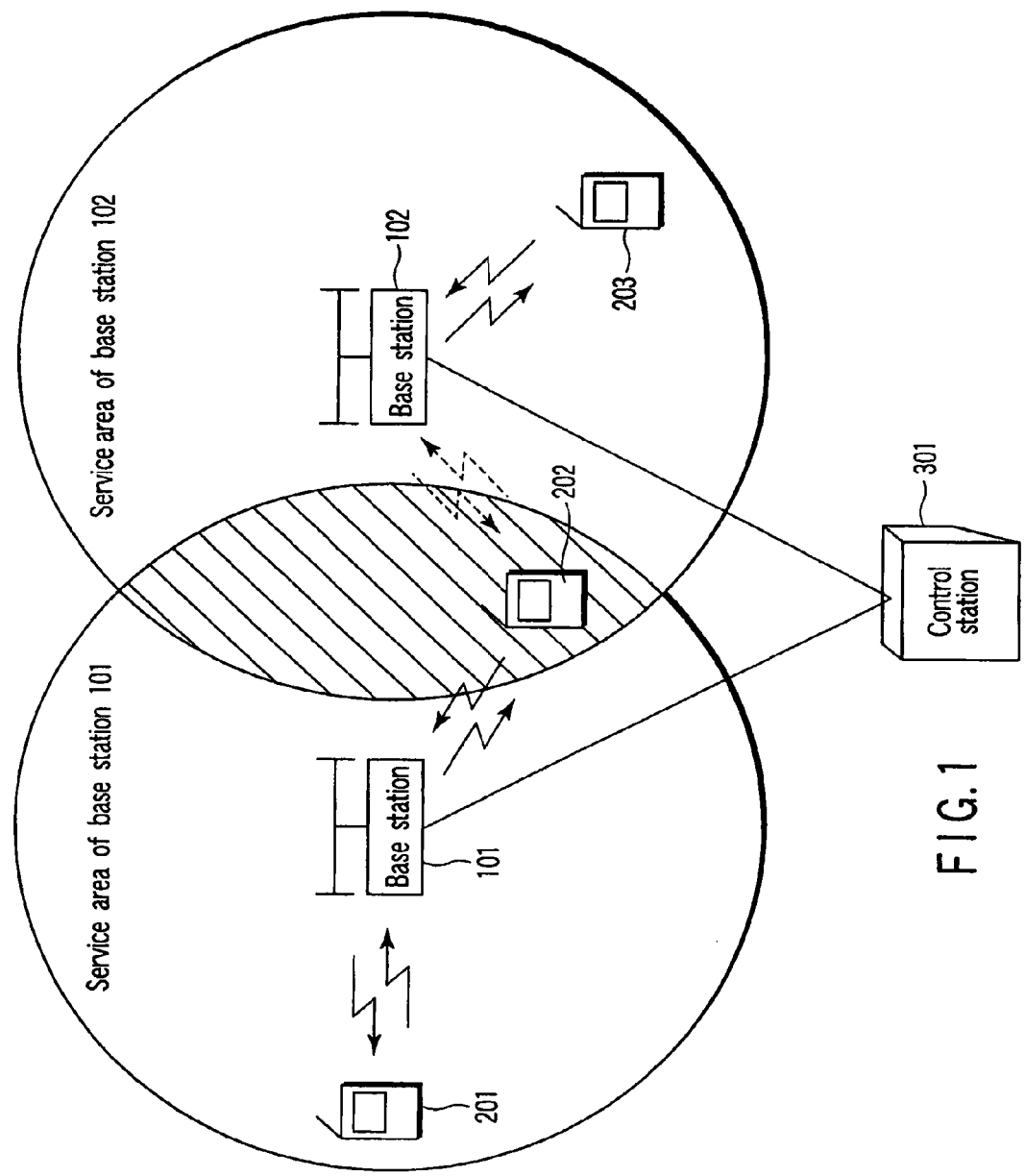
F I G. 1

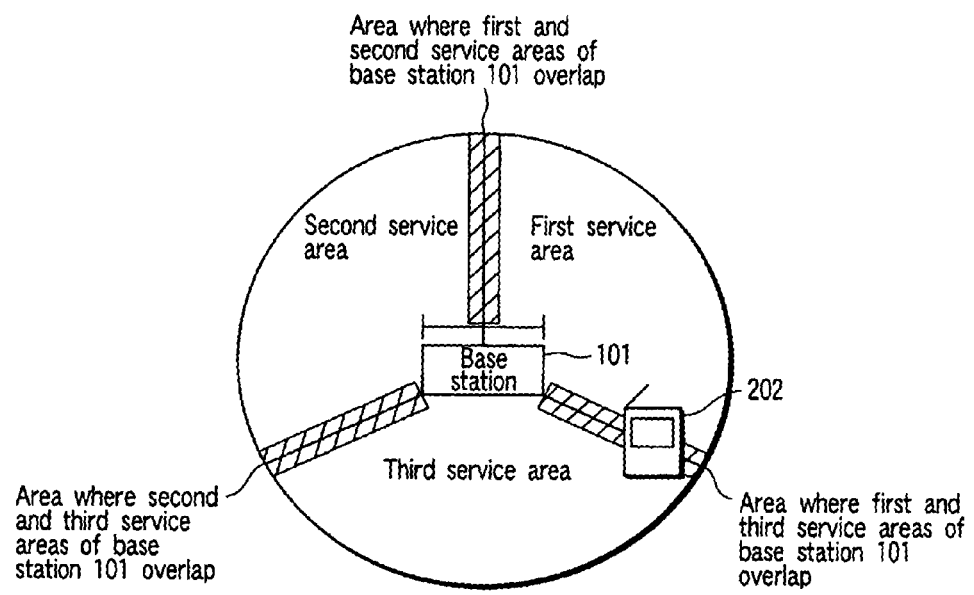
F I G. 2

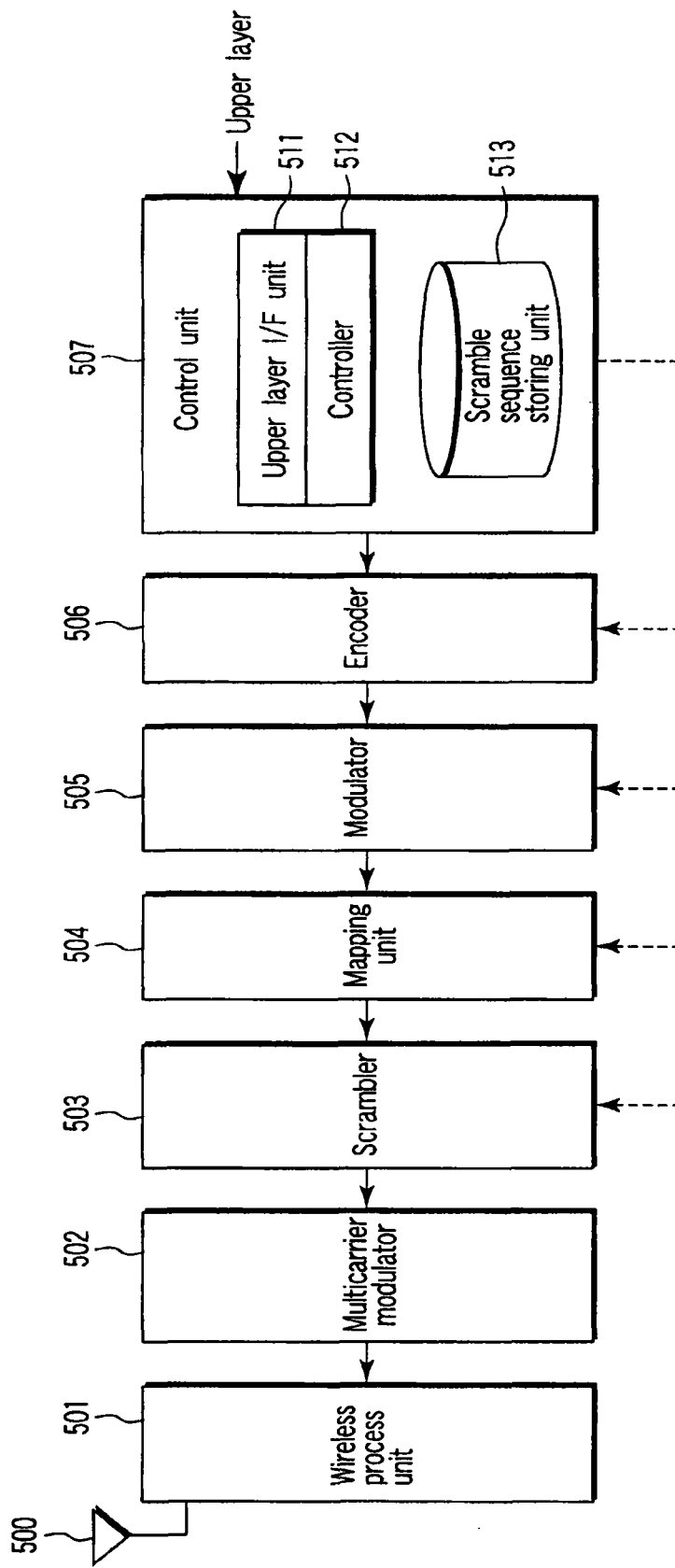
F I G. 5

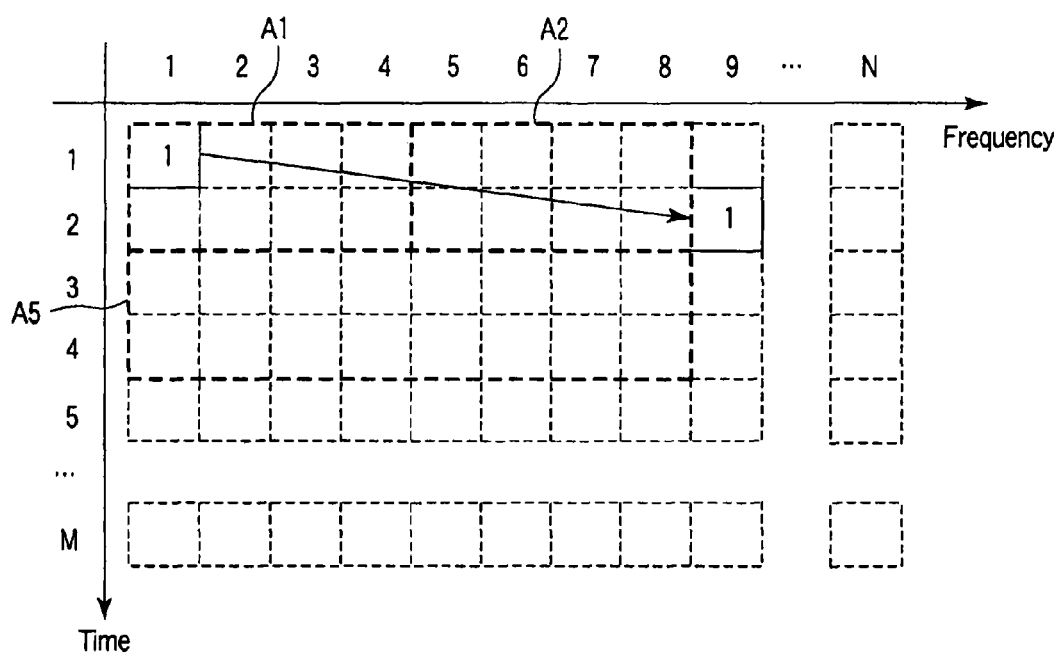
F I G. 10

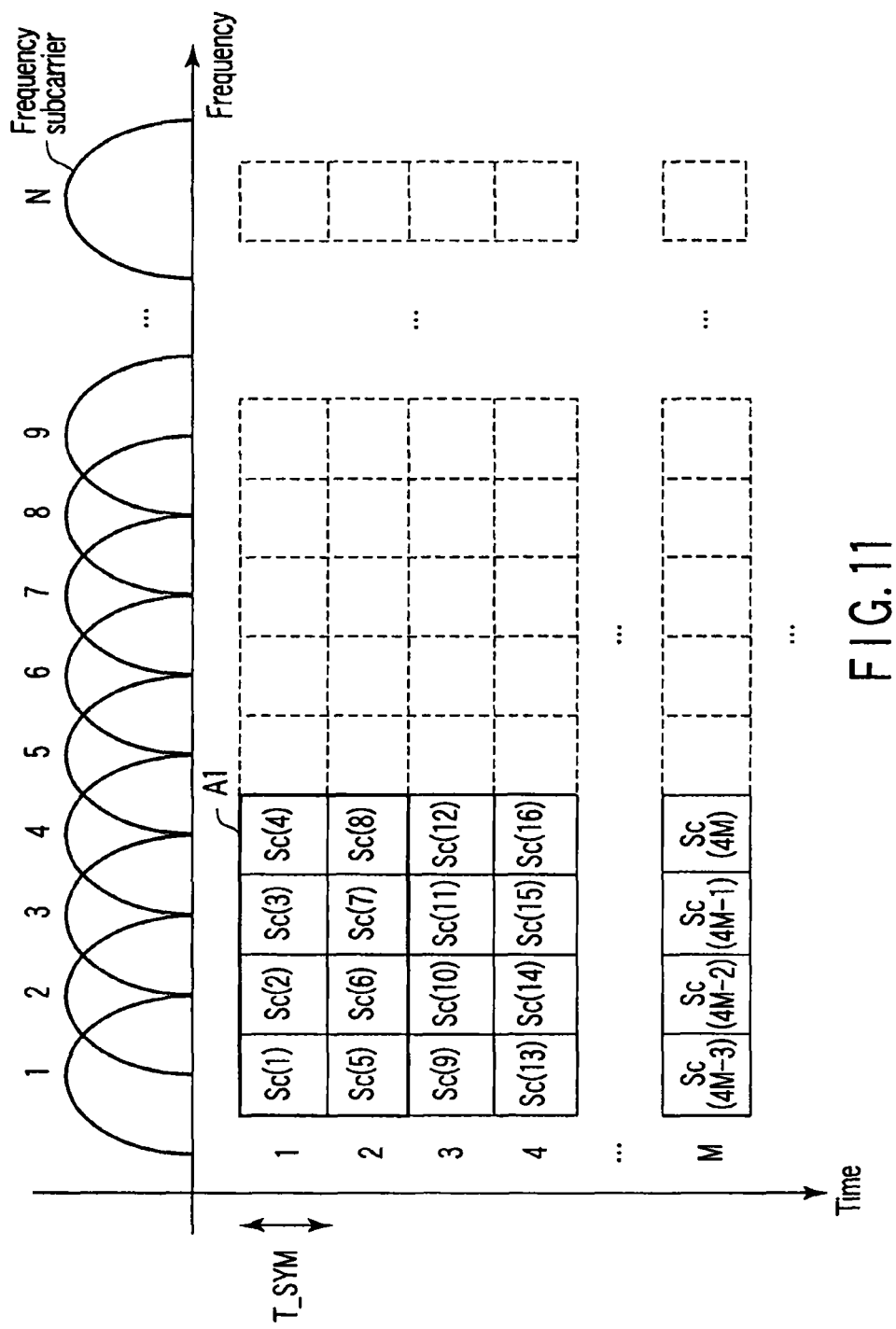
F I G. 11

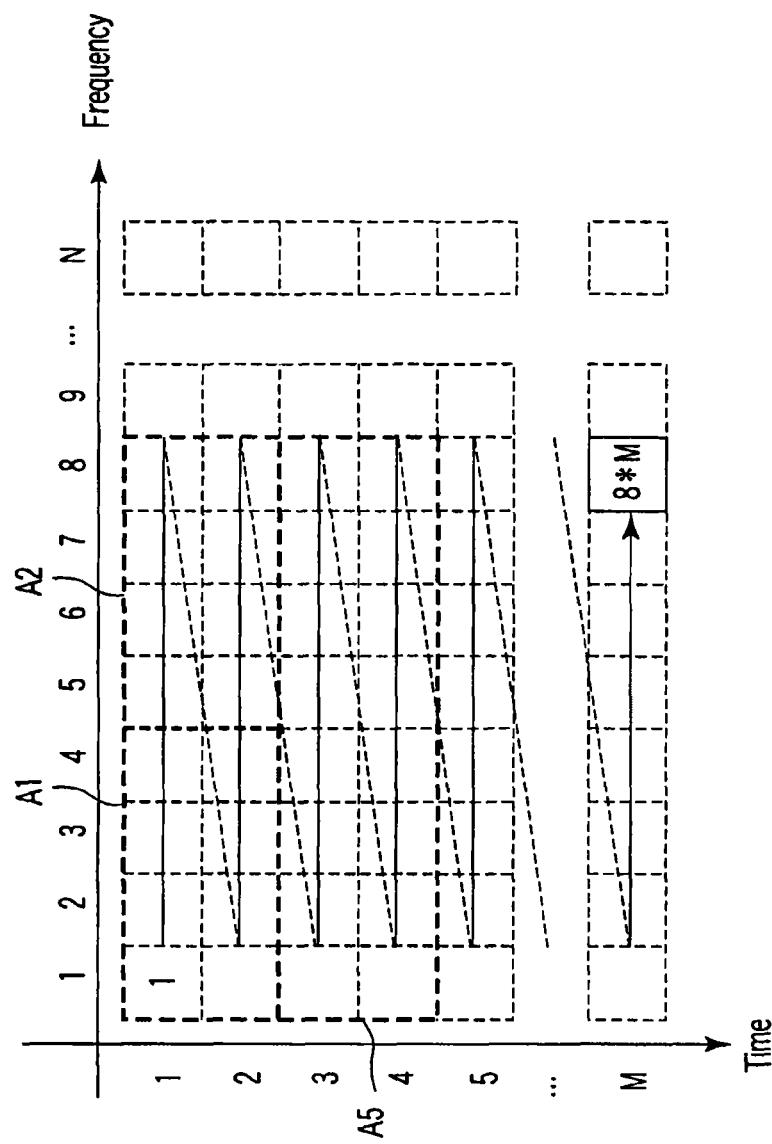
F I G. 12

Shift amount: four frequency subcarriers

Shift amount: two frequency subcarriers

WIRELESS COMMUNICATION APPARATUS, WIRELESS COMMUNICATION SYSTEM, AND TRANSMISSION METHOD

CROSS-REFERENCE TO RELATED APPLICATIONS

This application is a continuation of U.S. application Ser. No. 12/956,579, filed Nov. 30, 2010, which issued on Mar. 26, 2013 as U.S. Pat. No. 8,406,327, which is a continuation of U.S. application Ser. No. 11/827,557, filed Jul. 12, 2007, which issued on Jan. 11, 2011 as U.S. Pat. No. 7,869,531, which is based upon and claims the benefit of priority from prior Japanese Patent Application No. 2006-205088, filed Jul. 27, 2006, the entire contents of both of which are incorporated herein by reference.

BACKGROUND OF THE INVENTION

1. Field of the Invention

The present invention relates to a wireless communication apparatus which transmits a transmission symbol spread and multiplied by a code sequence.

2. Description of the Related Art

A recent wireless communication system performs wireless communication by letting a plurality of base stations use the same frequency band. In such a wireless communication system, interference from an adjacent base station or interference to an adjacent base station (inter-cell interference) sometimes affects the wireless communication performance. As one means for reducing the influence of this inter-cell interference, there is available a symbol spreading means for transmitting a data symbol to be transmitted by using a plurality of transmission symbols obtained by copying the data symbol. Using this means can improve the wireless communication performance in accordance with the number of copies. In order to improve the wireless communication performance by using the spreading means, it is necessary to cause a plurality of wireless communication apparatuses, e.g., wireless communication terminals which perform wireless communication with adjacent base stations or the same base station to multiply copied data symbols by predetermined code sequence called a scramble code sequence or the like. In addition, it is necessary to use different sequences as the scramble sequences for the respective wireless communication apparatuses.

In general, a sequence having randomness such as a pseudo-random sequence is used as the above scramble sequence, and hence the above inter-cell interference is randomized. This makes it possible to improve the wireless communication performance by spreading.

In a multicarrier wireless communication system typified by an orthogonal frequency division multiplexing (OFDM) system, which performs wireless communication by mapping transmission data on a plurality of frequency subcarriers, it is necessary to perform the above symbol spreading within the range of a plurality of frequency subcarriers and a plurality of symbols. As a scramble sequence multiplication method in this case, there is available a method of making the scramble sequence length equal to or more than the total number of frequency subcarriers and multiplying each element of the sequence for each frequency subcarrier (see, for example, [JP-A 2002-204217 (KOKAI) (Japanese Patent No. 3553038), FIGS. 3 to 5]).

In the above conventional technique, however, a plurality of symbols obtained by symbol spreading are sometimes multiplied by the same element of a scramble sequence. This reduces the effect of randomization of inter-cell interference which is obtained by making different wireless communication apparatuses multiply different scramble sequences. As a result, this also reduces the effect of improving the wireless communication performance by spreading the data symbol to be transmitted.

BRIEF SUMMARY OF THE INVENTION

A wireless communication apparatus (a) generates a transmission symbol; (b) assigns, to the transmission symbol, a given number of units each formed of a symbol and a subcarrier in a frame which is formed of M (M is a positive integer) symbols and N (N is a positive integer) subcarriers and includes M×N units, and the given number being not more than M×N, to obtain the given number of identical transmission symbols; (c) multiplies the identical transmission symbols by a code sequence including a plurality of different elements; and (d) transmits the identical transmission symbols multiplied by the code sequence.

BRIEF DESCRIPTION OF THE SEVERAL VIEWS OF THE DRAWING

FIG. 1 is a view showing an example of the arrangement of a wireless communication system according to an embodiment;

FIG. 2 is a view showing another example of the arrangement of the wireless communication system according to this embodiment;

FIG. 5 is a block diagram shown an example of the arrangement of the wireless communication apparatus;

FIG. 10 is a view for explaining a modification of the first example of the scramble sequence multiplication method in the scrambler;

FIG. 11 is a view for explaining the second example of the scramble sequence multiplication method in the scrambler;

FIG. 12 is a view for explaining a modification of the second example of the scramble sequence multiplication method in the scrambler;

DETAILED DESCRIPTION OF THE INVENTION

Figure 3:
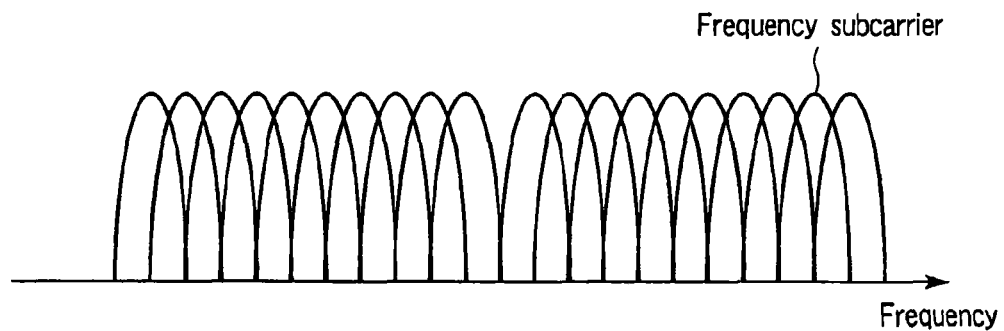
FIG. 3 is a view for explaining a wireless communication scheme to be applied to the wireless communication apparatus according to this embodiment.

An embodiment of the present invention will be described below with reference to the views of the accompanying drawing.

In FIG. 1, For the sake of simple explanation, there are two base stations 101 and 102, three wireless communication terminals 201, 202, and 203, and one control station 301. However, the present invention is not limited to this, and the wireless communication system can comprise an arbitrary number of base stations, an arbitrary number of wireless communication terminals, and an arbitrary number of control stations.

Referring to FIG. 1, the base stations 101 and 102 respectively have service areas, and are arranged such that the respective service areas partially overlap each other. The wireless communication terminals 201, 202, and 203 exist in at least one of the service areas of the base stations 101 and 102, and perform wireless communication with one of the base stations 101 and 102. In this case, the wireless communication terminal 201 exists in the service area of the base station 101 and is performing wireless communication with the base station 101. Assume that the wireless communication terminal 202 exists at a position where the service areas of the base stations 101 and 102 overlap each other, and is performing wireless communication with the base station 101. The wireless communication terminal 203 exists in the service area of the base station 102 and is performing wireless communication with the base station 102. Assume that this system uses the same frequency band for both communication between the base station 101 and the wireless communication terminals 201 and 202 and communication between the base station 102 and the wireless communication terminal 203.

The control station 301 comprehensively controls a plurality of base stations. The control station 301 controls to maintain synchronization between the base station 101 and the base station 102, and also controls the assignment of scramble sequences to be described later. Note that using GPS or the like makes it possible to autonomously control synchronization between the base station 101 and the base station 102.

Consider the wireless communication terminal 202. Although the wireless communication terminal 202 is performing wireless communication with the base station 101, since the wireless communication terminal 202 is also located within the service area of the base station 102, the wireless communication terminal 202 also receives radio signals from the base station 102 which are transmitted to other wireless communication terminals such as the wireless communication terminal 203 which communicates with the base station 102. As a consequence, the wireless communication terminal 202 receives interference by such radio signals during wireless communication with the base station 101. In addition, a radio signal transmitted from the wireless communication terminal 202 to the base station 101 reaches the base station 102. This indicates that such signals interfere with other wireless communication terminals such as the wireless communication terminal 203 communicating with the base station 102. The above interference will be referred to as inter-cell interference hereinafter. Note that the present invention reduces the influence of the above inter-cell interference by scrambling and spreading processing.

FIG. 2 shows a case wherein one base station 101 has a plurality of service areas (three service areas: the first to third service areas in the arrangement example in FIG. 2). In this case as well, there is a position where the respective service areas overlap each other. As in the arrangement example shown in FIG. 1, inter-cell interference occurs in the wireless communication terminal 202 located at the position wherein the respective service areas overlap each other. Therefore, the embodiment of the present invention will be described with reference to FIG. 1. However, the present invention can also be applied to even a case wherein one base station has a plurality of service areas as shown in FIG. 2.

The wireless communication scheme suitable for the embodiment is a scheme called a multicarrier wireless communication scheme, which performs wireless communication by using a plurality of frequency subcarriers as shown in FIG. 3. This scheme is typified by orthogonal frequency division multiplexing (OFDM) or the like.

Figure 4:
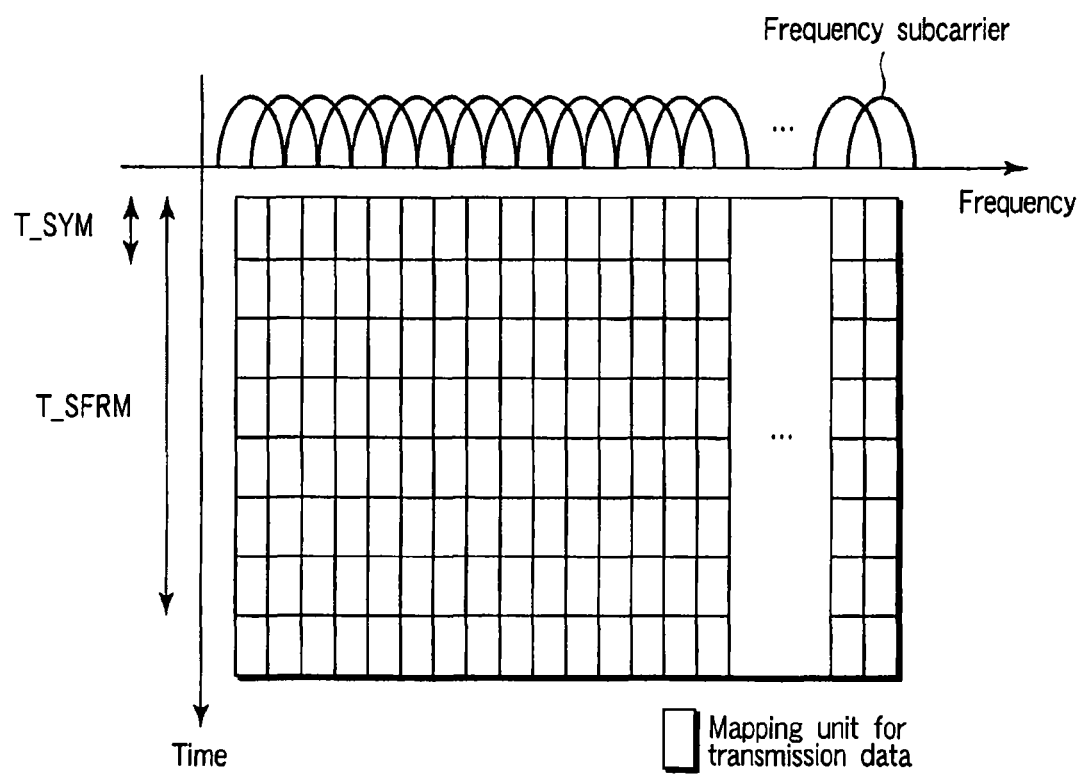
FIG. 4 is a view showing an example of a frame format.

Referring to FIG. 4, a symbol is defined by a predetermined period (T_SYM). As shown in FIG. 3, since the wireless communication scheme used in the wireless communication system of this embodiment uses a plurality of frequency subcarriers (the number of subcarriers is represented by N in this case), transmission data are mapped every symbol and every frequency subcarrier described above. Furthermore, a subframe is defined by N frequency subcarriers and a predetermined period (T_SFRM) including a predetermined number (e.g., M) of symbols.

A unit (one frequency subcarrier/one symbol) into which transmission data is mapped will be referred to as a data symbol hereinafter. Referring to FIG. 4, one subframe comprises seven symbols. The number of symbols constituting a subframe can be arbitrarily defined.

Referring to FIG. 5, the transmitter of the wireless communication apparatus comprises an antenna 500, wireless process unit 501, multicarrier modulator 502, scrambler 503, mapping unit 504, modulator 505, encoder 506, and control unit 507. The control unit 507 comprises an upper layer interface unit 511, controller 512, and scramble sequence storing unit 513.

Although the arrangement example shown in FIG. 5 can be applied to any of the base stations and wireless communication terminals shown in FIGS. 1 and 2, the respective stations and terminals store different scramble sequences in the scramble sequence storing units 513. When this arrangement is applied to a base station, the scramble sequence storing unit 513 stores the scramble sequence notified from the control station 301 and assigned to the base station. Assume that different scramble sequences are assigned to the respective base stations. When the arrangement is applied to a wireless communication terminal, the scramble sequence storing unit 513 stores the scramble sequence notified from a base station or uniquely determined for each wireless communication terminal. Assume that different scramble sequences are assigned to the respective wireless communication terminals.

An example of the operation of the transmitter of the wireless communication apparatus in FIG. 5 will be described next. The upper layer interface unit 511 of the control unit 507 receives data to be transmitted from the upper layer. The upper layer interface unit 511 inputs each data which can be transmitted over one subframe to the encoder 506. The encoder 506 adds a predetermined error detection code such as a CRC to the input data, and performs error correction encoding by a predetermined encoding scheme and at a predetermined encoding rate. The modulator 505 receives the encoded data obtained by encoding by the encoder 506. The modulator 505 generates a transmission symbol by modulating the input encoded data in accordance with a predetermined modulation scheme. The mapping unit 504 receives the generated transmission symbol. Note that the controller 512 of the control unit 507 determines the above encoding scheme, encoding ratio, and modulation scheme, and notifies the encoder 506 and the modulator 505 of the corresponding information.

The mapping unit 504 maps the transmission symbol on the frequency subcarrier and symbol (data symbol) notified from the controller 512 of the control unit 507, and outputs the result as a multicarrier transmission symbol to the scrambler 503.

The scrambler 503 multiplies the input multicarrier transmission symbol by the scramble sequence notified from the controller 512 of the control unit 507, e.g., each element of a pseudo random sequence, and outputs the result to the multicarrier modulator 502.

The multicarrier modulator 502 performs multicarrier modulation such as Fast Fourier Transform with respect to the input multicarrier transmission symbol after scrambling, and outputs the result as a multicarrier modulated symbol to the wireless process unit 501.

The wireless process unit 501 generates a radio signal by performing predetermined wireless process such as conversion from digital data to an analog signal (digital-to-analog conversion), quadrature modulation, up-conversion, band limiting, and power amplification with respect to the input multicarrier modulated symbol. The antenna 500 transmits this radio signal.

Figure 6:
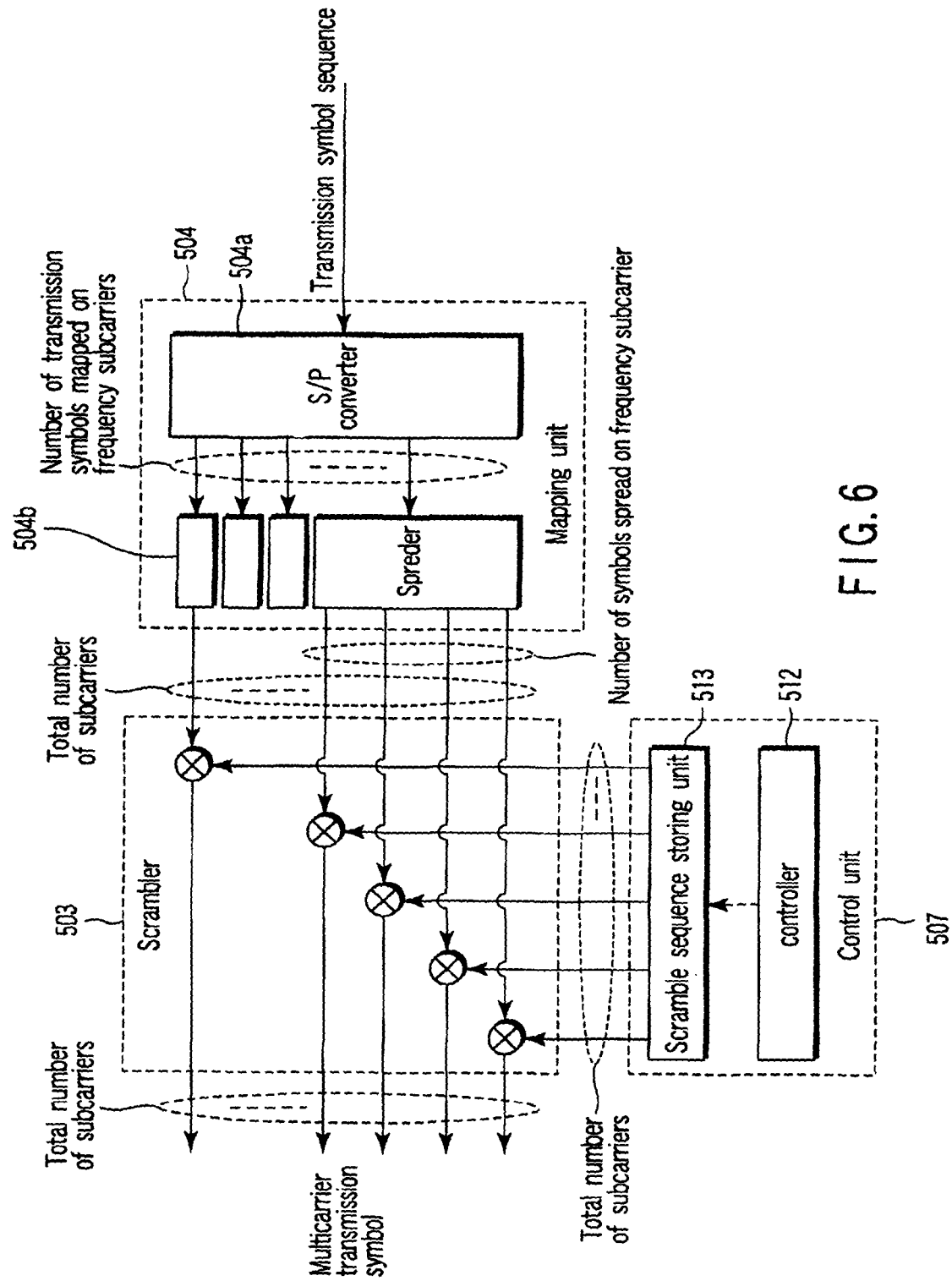
FIG. 6 is a block diagram showing an example of the detailed arrangement of a mapping unit and scrambler in FIG. 5.

The operations of the mapping unit 504 and scrambler 503 will be further described with reference to FIG. 6. The mapping unit 504 receives a transmission symbol sequence, and performs S/P conversion of each input transmission symbol into the number of transmission symbols to be mapped on the frequency subcarriers by using an S/P converter 504a. Each of spreaders 504b receives the symbol which is the output from the S/P converter 504a. Each spreader 504b generates the number of transmission symbols from the transmission symbol by copying the transmission symbol, the number corresponding to the number of symbols to be spread along the frequency subcarrier. Therefore the spreaders 504b output the resultant data as multicast transmission symbols to the scrambler 503. The scrambler 503 therefore receives the multicarrier transmission symbols corresponding to the total number of frequency subcarriers.

The scrambler 503 multiplies each input multicarrier transmission symbol by a corresponding element of the scramble sequence output from the scramble sequence storing unit 513 on a frequency-subcarrier basis. The multicarrier modulator 502 receives the multiplication results. At this time, the controller 512 of the control unit 507 controls the scramble sequence output from the scramble sequence storing unit 513. This control operation will be described later.

Spreading processing by the mapping unit 504 will be described next with reference to FIG. 7. The mapping unit 504 maps the input transmission symbol to a given number of data symbols. The mapping unit 504 performs, as spreading processing, copying the transmission symbols to generate transmission symbols in number corresponding to a given spreading ratio, and mapping the transmission symbols to a plurality of data symbols.

Figure 7:
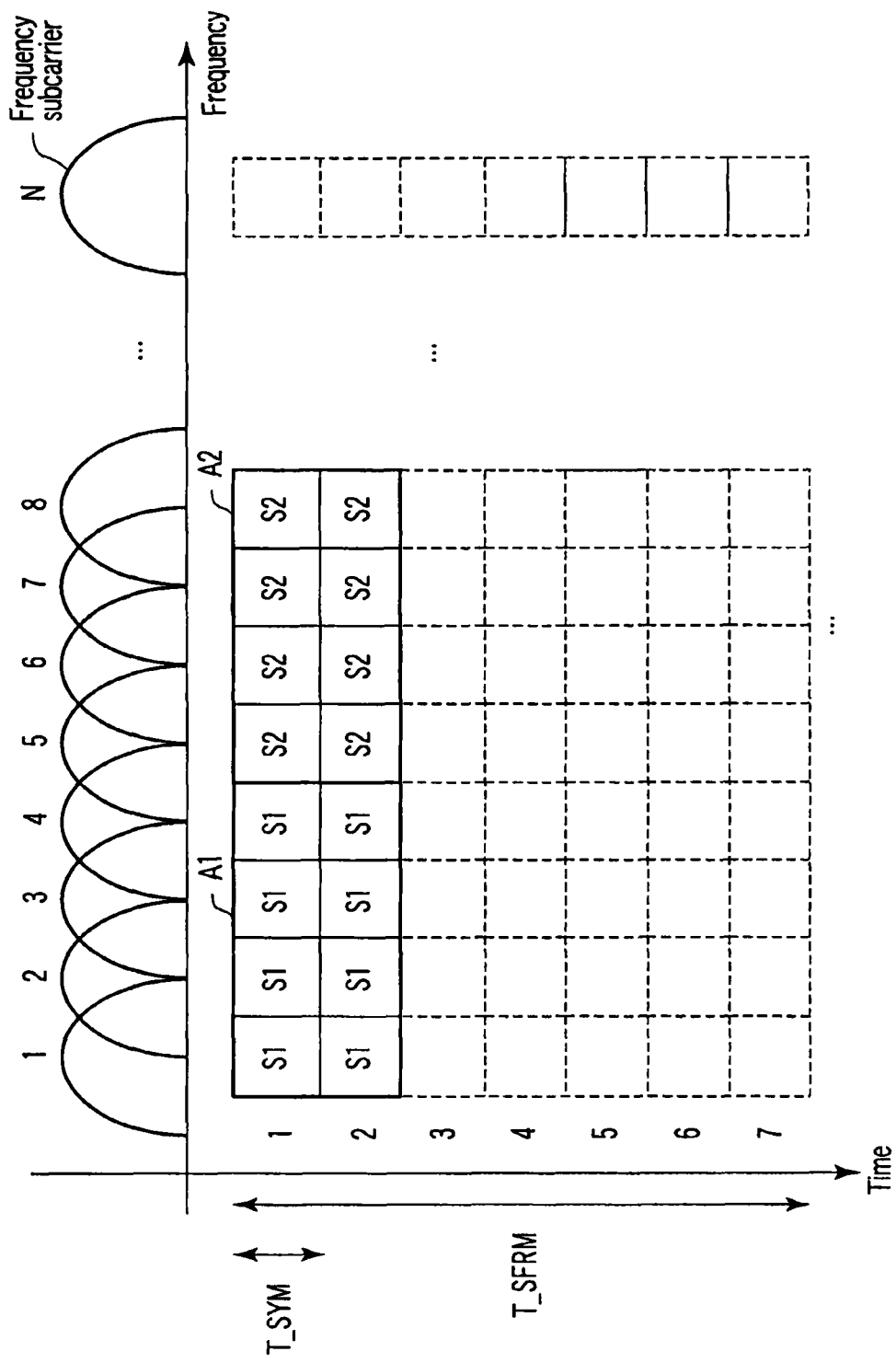
FIG. 7 is a view for explaining spreading processing by the mapping unit.

In the example shown in FIG. 7, a spreading ratio of "8" has been notified, and a transmission symbol S1 is mapped to eight data symbols represented by frequency subcarrier numbers "1" to "4" with symbol number "1" and frequency subcarrier numbers "1" to "4" with symbol number "2" within a time/frequency domain A1 defined by symbol numbers "1" and "2" and frequency subcarrier numbers "1" to "4". A transmission symbol S2 is mapped to eight data symbols represented by frequency subcarrier numbers "5" to "8" with symbol number "1" and frequency subcarrier numbers "5" to "8" with symbol number "2" within a time/frequency domain A2 defined by symbol numbers "1" and "2" and frequency subcarrier numbers "5" to "8". In this manner, the mapping unit 504 spreads and maps transmission symbols within the range of "symbol count P× frequency subcarrier count Q".

Note that it is possible to arrange consecutively or discretely symbols and frequency subcarriers (data symbols) to which mapping is performed. In the example shown in FIG. 8, a spreading ratio of "8" has been notified, and a transmission symbol S1 is mapped to eight data symbols represented by frequency subcarrier numbers "1", "3", "5", and "7" with symbol number "1" and frequency subcarrier numbers "2", "4", "6", and "8" with symbol number "2" within a time/frequency domain A3 defined by symbol numbers "1" and "2" and frequency subcarrier numbers "1" to "8". A transmission symbol S2 is mapped to eight data symbols represented by frequency subcarrier numbers "1" and "3" with symbol number "3", frequency subcarrier numbers "5" and "7" with symbol number "4", frequency subcarrier numbers "2" and "4" with symbol number "5", and frequency subcarrier numbers "6" and "8" with symbol number "6" within a time/frequency domain A4 defined by symbol numbers "3" to "6" and frequency subcarrier numbers "1" to "8".

Note that the controller 512 of the control unit 507 makes notification of a predetermined spreading ratio and corresponding data symbol positions to which mapping is to be performed. In the examples shown in FIGS. 7 and 8, the frequency subcarrier count is defined as N (N is an arbitrary integer).

The operation of the scrambler 503 will be described next with reference to FIG. 9. The scrambler 503 multiplies input multicarrier transmission symbols by a predetermined scramble sequence (code sequence). Note that the scramble sequence storing unit 513 of the control unit 507 stores the scramble sequence. The scramble sequence storing unit 513 is composed of a cyclic shift register which cyclically shifts the scramble sequence under the control of the controller 512 of the control unit 507.

Figure 9:
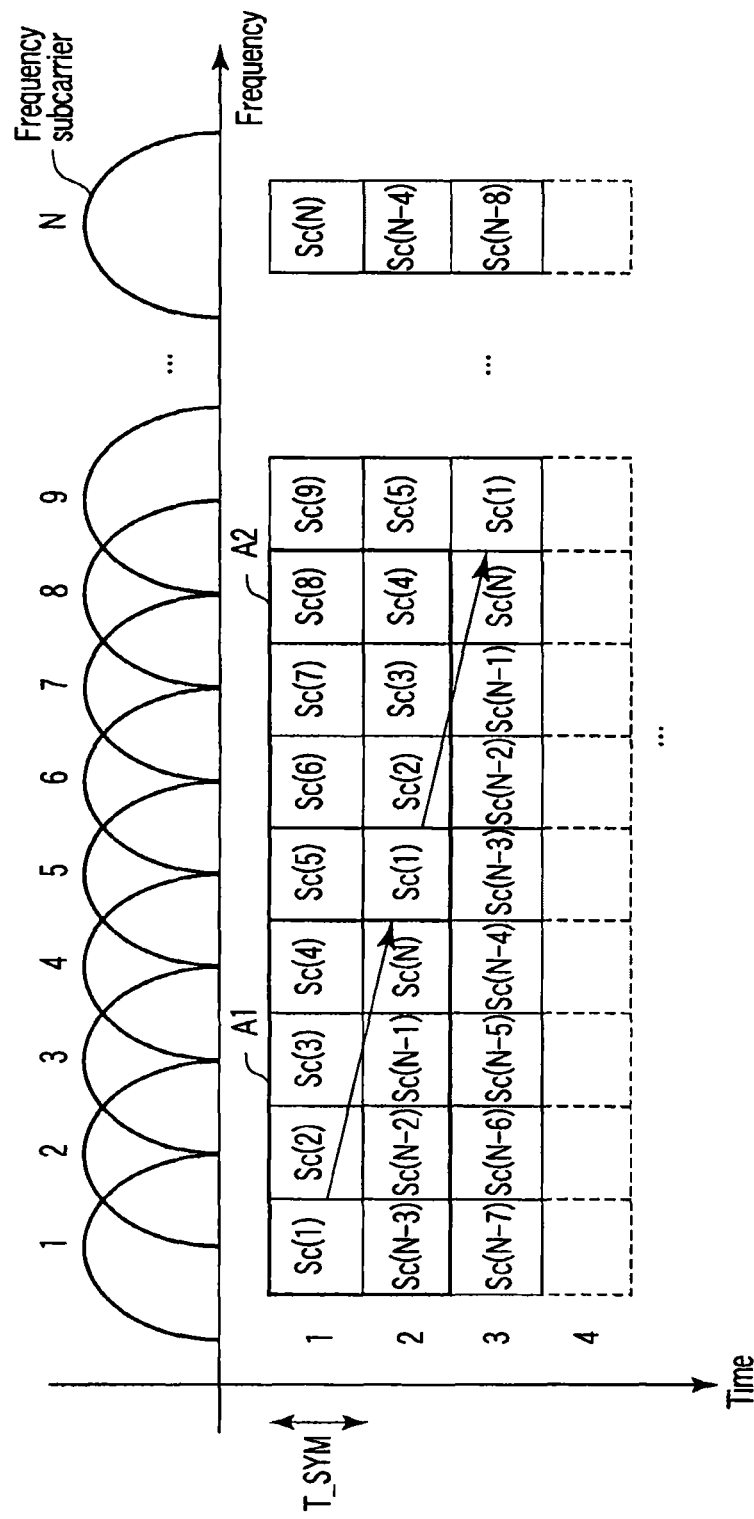
FIG. 9 is a view for explaining the first example of a scramble sequence multiplication method in the scrambler.

In the example shown in FIG. 9, the number of elements in a scramble sequence (Sc(1), Sc(2), . . . , Sc(N)), i.e., a sequence length N, is equal to the total number of frequency subcarriers, and the data symbol assigned to each frequency subcarrier at the same symbol is multiplied by a corresponding one of the (Sc(1) to Sc(N)) elements of the scramble sequence.

Figure 8:
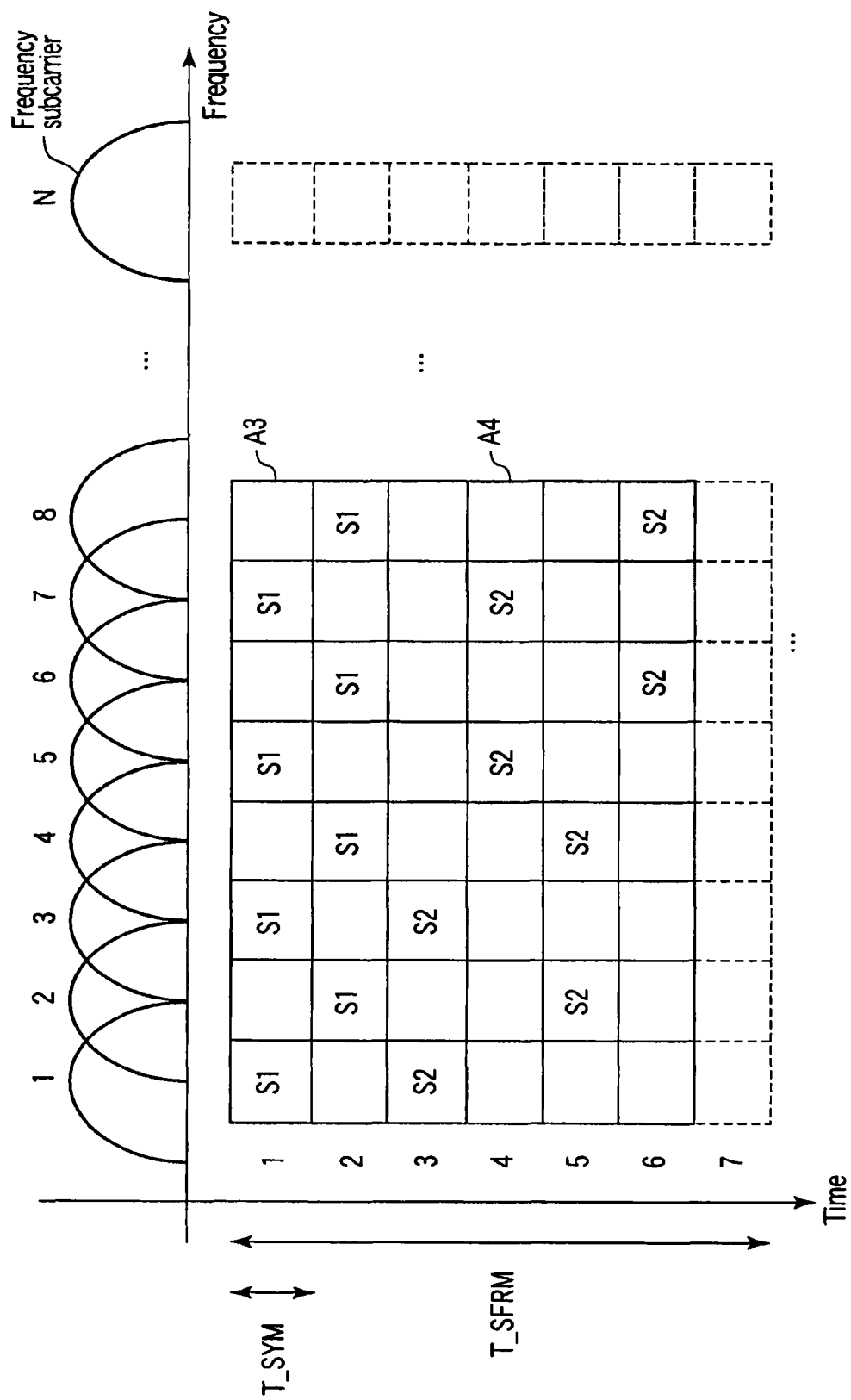
FIG. 8 is a view for explaining another spreading processing by the mapping unit.

As shown in FIGS. 7 and 8, the mapping unit 504 spreads and maps one transmission symbol within the range of "symbol count P× frequency subcarrier count Q".

In this case, the scramble sequence storing unit 513 cyclically shifts the scramble sequence by the frequency subcarrier count Q for each symbol.

For example, in the example shown in FIG. 9, as shown in FIG. 7, the mapping unit 504 assigns (spreads and maps) each transmission symbol for each time/frequency domain defined by symbol count "2"× frequency subcarrier count "4" in a subframe. That is, the mapping unit 504 maps a transmission symbol S1 in a time/frequency domain A1 defined by symbol numbers "1" and "2" and frequency subcarrier numbers "1" to "4", and maps a transmission symbol S2 in a time/frequency domain A2 defined by symbol numbers "1" and "2" and frequency subcarrier numbers "5" to "8".

In this case, the transmission symbols assigned to the first to Nth frequency subcarriers with symbol number "1" are multiplied by the first to Nth elements Sc(1) to Sc(N) of the scramble sequence, respectively. At symbol number "2", the scramble sequence has been cyclically shifted by the frequency subcarrier count Q (=4), and hence the transmission symbols assigned to the fifth to Nth frequency subcarriers are multiplied by the first to "N−4"th elements Sc(1) to Sc(N−4) of the scramble sequence, respectively, and the transmission symbols assigned to the first to fourth frequency subcarriers are multiplied by the "N−3"th to Nth elements Sc(N−3) to Sc(N) of the scramble sequence.

At symbol number "3", the scramble sequence has been cyclically shifted by the frequency subcarrier count Q (=4), and hence the transmission symbols assigned to the ninth to Nth frequency subcarriers are multiplied by the first to "N−8"th elements Sc(1) to Sc(N−8) of the scramble sequence, respectively, and the transmission symbols assigned to the first to eighth frequency subcarriers are multiplied by the "N−7"th to Nth elements Sc(N−7) to Sc(N) of the scramble sequence.

In this manner, the scramble sequence storing unit 513 cyclically shifts a random sequence comprising N elements, by which the respective transmission symbols assigned to the respective frequency subcarriers of the respective symbols are multiplied, by the frequency subcarrier count Q for every symbol (in the time/frequency domain in which the mapping unit 504 spreads and maps the transmission symbols) under the control of the controller 512. The scrambler 503 then multiplies the transmission symbols assigned to the respective frequency subcarriers of the respective symbols by the resultant random sequence.

As shown in FIG. 10, if time/frequency domains in which transmission symbols are spread and mapped differ in size, the scramble sequence storing unit 513 cyclically shifts a scramble sequence by the number of frequency subcarriers of a domain A5, of all time/frequency domains A1, A2, and A5, which has the largest number of frequency subcarriers.

In the example shown in FIG. 10, the transmission symbols S1 and S2 are assigned for each time/frequency domain defined by symbol count "2"× frequency subcarrier count "4" in a subframe. That is, the transmission symbol S1 is mapped in the time/frequency domain A1 defined by symbol numbers "1" and "2" and frequency subcarrier numbers "1" to "4". The transmission symbol S2 is mapped in the time/frequency domain A2 defined by symbol numbers "1" and "2" and frequency subcarrier numbers "5" to "8". However, a transmission symbol S3 is assigned to the time/frequency domain A5 defined by symbol count "2"× frequency subcarrier count "8". Therefore, the cyclic shift amount is "8".

In this case, the transmission symbols assigned to the first to Nth frequency subcarriers with symbol number "1" are multiplied by the first to Nth elements Sc(1) to Sc(N) of the scramble sequence, respectively. At symbol number "2", since the scramble sequence has been cyclically shifted by the frequency subcarrier count Q (=8), the transmission symbols assigned to the ninth to Nth frequency subcarriers are multiplied by the first to "N−8"th elements Sc(1) to Sc(N−8) of the scramble sequence, respectively, and the transmission symbols assigned to the first to eighth frequency subcarriers are multiplied by the "N−7"th to Nth elements Sc(N−7) to Sc(N) of the scramble sequence, respectively.

Equation (1) represents the multicarrier transmission symbols multiplied by the scramble sequence by the operation of the scrambler 503 shown in FIGS. 9 and 10.

Let Txsym(m,n) be a multicarrier transmission symbol corresponding to the mth symbol and the nth frequency subcarrier which the scrambler 503 outputs, Dsym(m,n) be a multicarrier transmission symbol corresponding to the mth symbol and the nth frequency subcarrier which the scrambler 503 receives, Sc(i) be the ith element of the scramble sequence, M be the total number of transmission symbols contained in a subframe, N be the total number of frequency subcarriers, and Q be the number of frequency subcarriers of a time/frequency domain in which the mapping unit 504 spreads and maps the transmission symbols.

$$Txsym(m,n) = Dsym(m,n) \times Sc(i) \quad (1)$$

$i = (n - ((m \times Q) \bmod N))$ if $((n - ((m \times Q) \bmod N)) \geq 0$
$i = (n - ((m \times Q) \bmod N)) + N$ if $((n - ((m \times Q) \bmod N)) < 0$
  m=0 ... M−1
  n=0 ... N−1

According to equation (1), the number of symbols of the time/frequency domain in which the mapping unit 504 spreads and maps transmission symbols is limited to the maximum integer which does not exceed N/Q.

Another operation of the scrambler 503 will be described next with reference to FIG. 11. In the example shown in FIG. 11, when mapping transmission symbols in a subframe with a symbol count M (M is a positive integer equal to or more than two) and a frequency subcarrier count N (N is a positive integer equal to or more than two) for each time/frequency domain defined by a symbol count P (P is an integer equal to or more than one and equal to or less than M) and a frequency subcarrier count Q (Q is an integer equal to or more than one and equal to or less than N), the scrambler 503 multiplies data symbols assigned to the respective frequency subcarriers of the frequency subcarrier count Q of the first to Mth symbols of the subframe by a random sequence comprising Q×M elements.

As shown in FIG. 11, if the frequency subcarrier count Q of a time/frequency domain assigned to one transmission symbol is "4", the sequence length of a scramble sequence is 4×M.

More specifically, the transmission symbols assigned to the first to fourth frequency subcarriers of the first symbol are sequentially multiplied by the first to fourth elements Sc(1) to Sc(4) of the scramble sequence. The transmission symbols assigned to the first to fourth frequency subcarriers of the second symbol are sequentially multiplied by the fifth to eighth elements Sc(5) to Sc(8) of the scramble sequence. The data symbols of the first to fourth frequency subcarriers of the Mth symbol are sequentially multiplied by the "M−3"th to Mth elements Sc(M−3) to Sc(M).

The fifth and subsequent frequency subcarriers are multiplied by the scramble sequence by the same method as described above. That is, the transmission symbols assigned to the fifth to eighth frequency subcarriers of the first symbol are sequentially multiplied by the first to fourth elements Sc(1) to Sc(4) of the scramble sequence. The transmission symbols assigned to the fifth to eighth frequency subcarriers of the second symbol are sequentially multiplied by the fifth to eighth elements Sc(5) to Sc(8). The transmission symbols assigned to the fifth to eighth frequency subcarriers of the Mth symbol are sequentially multiplied by the (M−3)th to Mth elements Sc(M−3) to Sc(M).

As shown in FIG. 12, if time/frequency domains in which the respective transmission symbols are spread and mapped differ in size, the number of elements of the scramble sequence is set to "8"×"symbol count M of subframe" in accordance with the number of frequency subcarriers (in this case, "8") of a domain A5, of all time/frequency domains A1, A2, and A5, which has the largest number of frequency subcarriers.

In the example shown in FIG. 12, a transmission symbol S1 is assigned to the time/frequency domain A1 defined by symbol count "2" and frequency subcarrier count "4". Likewise, a transmission symbol S2 is assigned to the time/frequency domain A2 defined by symbol count "2" and frequency subcarrier count "4". A transmission symbol S3 is spread and mapped in the time/frequency domain A5 defined by symbol count "2" and frequency subcarrier count "8". The size of the scramble sequence in the frequency subcarrier direction is "8".

Equation (2) represents the multicarrier transmission symbols multiplied by the scramble sequence by the operation of the scrambler 503 shown in FIGS. 11 and 12.

Let Txsym(m,n) be a multicarrier transmission symbol corresponding to the mth symbol and the nth frequency subcarrier which the scrambler 503 outputs, Dsym(m,n) be a multicarrier transmission symbol corresponding to the mth symbol and the nth frequency subcarrier which the scrambler 503 receives, Sc(i) be the ith element of the scramble sequence, M be the total number of transmission symbols contained in a subframe, N be the total number of frequency subcarriers, and Q be the number of frequency subcarriers of a time/frequency domain in which the mapping unit 504 spreads and maps the transmission symbols.

$$Txsym(m,n)=Dsym(m,n)\times Sc(i) \quad (2)$$

i=(m×Q+(n mod Q))
m=0 ... M−1
n=0 ... N−1

Another operation of the scrambler 503 will be described next with reference to FIG. 13. In the example shown in FIG. 13, when mapping transmission symbols in a subframe with a symbol count M (M is a positive integer equal to or more than two) and a frequency subcarrier count N (N is a positive integer equal to or more than two) for each time/frequency domain defined by a symbol count P (P is an integer equal to or more than one and equal to less than M) and a frequency subcarrier count Q (Q is an integer equal to or more than one and equal to or less than N), the scrambler 503 multiplies data symbols assigned to the first to Nth frequency subcarriers of each symbol of the symbol count P of the subframe by a random sequence comprising P×N elements.

Figure 13:
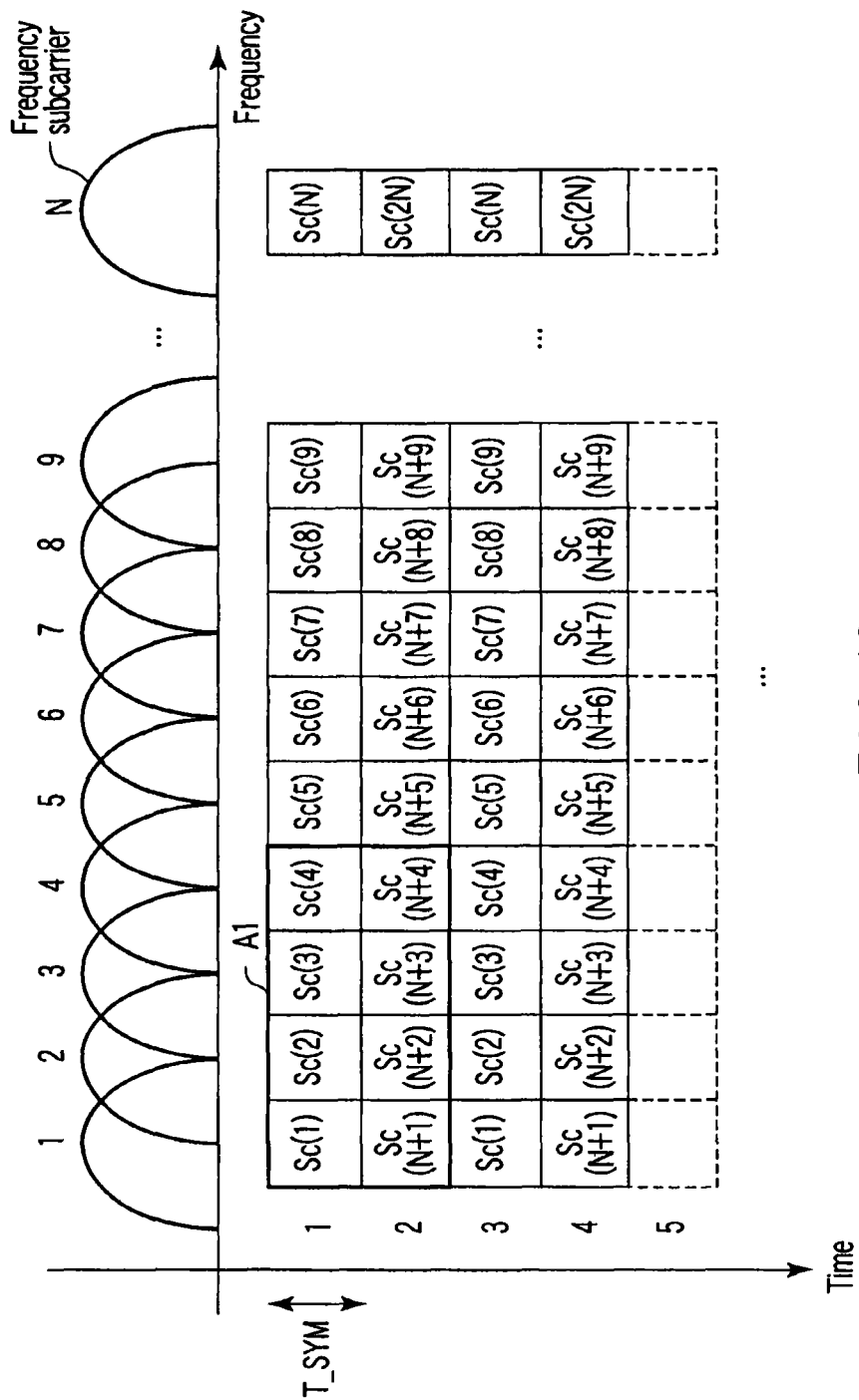
FIG. 13 is a view for explaining the third example of the scramble sequence multiplication method in the scrambler.

As shown in FIG. 13, if the number of symbols of the time/frequency domain assigned to one transmission symbol is "2", the sequence length of the scramble sequence is 2×N.

More specifically, the transmission symbols assigned to the first to Nth frequency subcarriers of the first symbol are sequentially multiplied by the first to Nth elements Sc(1) to Sc(N) of the scramble sequence. The transmission symbols assigned to the first to Nth frequency subcarriers of the second symbol are sequentially multiplied by the "N+1"th to "2×N"th elements Sc(N+1) to Sc(2×N).

In addition, the third and subsequent symbols are multiplied by the scramble sequence by the same method. That is, the transmission symbols assigned to the first to Nth frequency subcarriers of the third symbol are sequentially multiplied by the first to Nth elements Sc(1) to Sc(N) of the scramble sequence. The transmission symbols assigned to the first to Nth frequency subcarriers of the fourth symbol are sequentially multiplied by the "N+1"th to "2×N"th elements Sc(N+1) to Sc(2×N).

Figure 14:
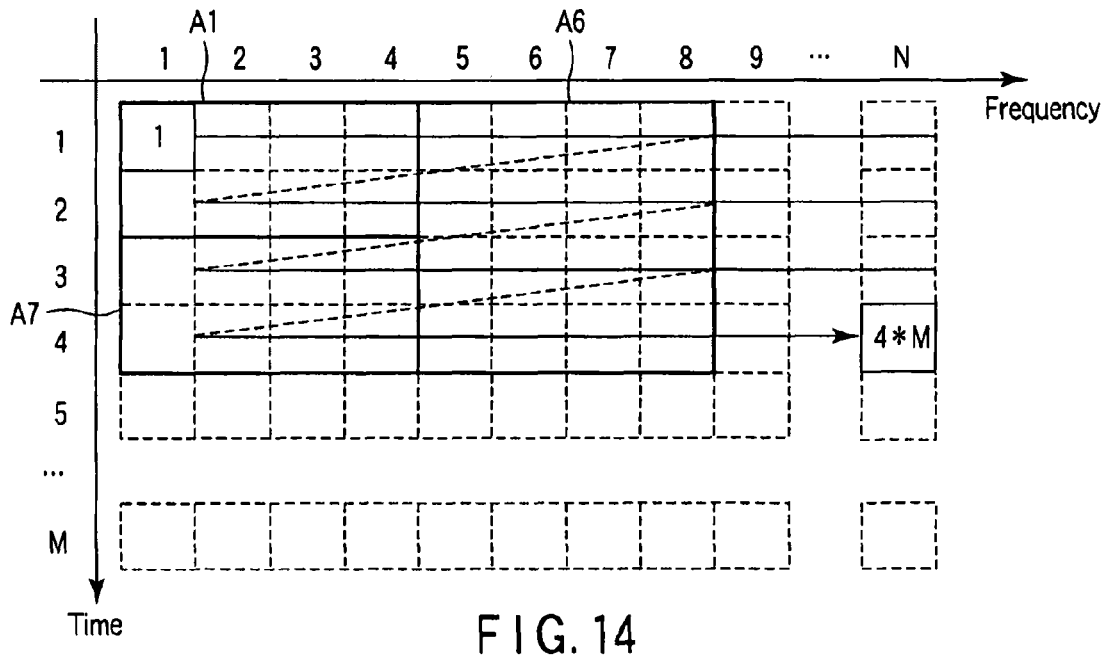
FIG. 14 is a view for explaining a modification of the third example of the scramble sequence multiplication method in the scrambler.

As shown in FIG. 14, if time/frequency domains in which transmission symbols are spread and mapped differ in size, the number of elements of the scramble sequence is set to "frequency subcarrier count N of subframe"×"4" in accordance with the number of symbols (in this case, "4") of a domain A6, of all time/frequency domains A1, A6, and A7, which has the largest number of symbols.

In the example shown in FIG. 14, a transmission symbol S1 is assigned to the time/frequency domain A1 defined by symbol count "2" and frequency subcarrier count "4". A transmission symbol S2 is assigned to the time/frequency domain A6 defined by symbol count "4" and frequency subcarrier count "4". A transmission symbol S3 is assigned to the time/frequency domain A7 defined by symbol count "2" and frequency subcarrier count "4". The size of the scramble sequence in the time direction is "4" which is the number of symbols of the time/frequency domain A6.

Equation (3) represents the multicarrier transmission symbols multiplied by the scramble sequence by the operation of the scrambler 503 shown in FIGS. 13 and 14.

Let Txsym(m,n) be a multicarrier transmission symbol corresponding to the mth symbol and the nth frequency subcarrier which the scrambler 503 outputs, Dsym(m,n) be a multicarrier transmission symbol corresponding to the mth symbol and the nth frequency subcarrier which the scrambler 503 receives, Sc(i) be the ith element of the scramble sequence, M be the total number of transmission symbols contained in a subframe, N be the total number of frequency subcarriers, and Q be the number of frequency subcarriers of a time/frequency domain in which the mapping unit 504 spreads and maps the transmission symbols.

$$Txsym(m,n)=Dsym(m,n)\times Sc(i) \quad (3)$$

i=(n+(m mod P)×N)
m=0 ... M−1
n=0 ... N−1

As has been described above, according to the techniques shown in FIGS. 9 to 14, when a plurality of wireless communication apparatuses simultaneously perform wireless communication in an environment in which they use the same frequency band, causing the respective wireless communication apparatuses to respectively multiply spread transmission symbols by different sequence elements makes it possible to perform wireless communication while suppressing interference between adjacent base stations without degrading the effect obtained by spreading transmission symbols.

Figure 15A:
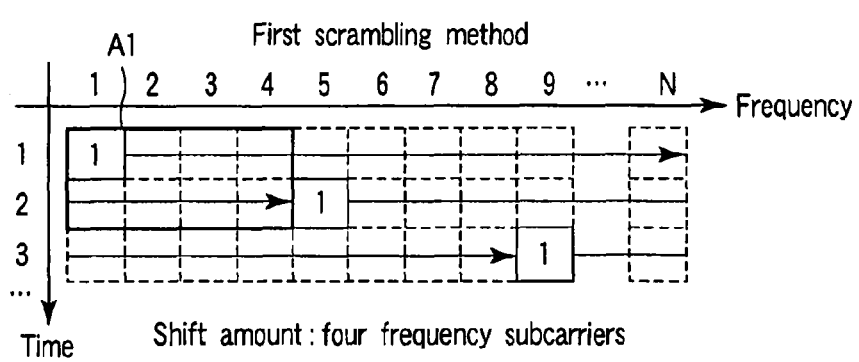
FIGS. 15A and 15B are views for explaining the fourth example of the scramble sequence multiplication method in the scrambler.
Figure 15B:
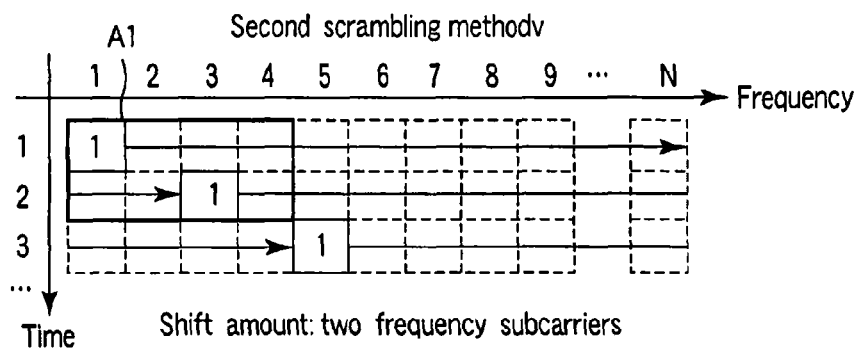

Another operation of the scrambler 503 will be described next with reference to FIGS. 15A and 15B. FIGS. 15A and 15B show a modification of the operation example described with reference to FIG. 9.

The following will exemplify a case wherein the mapping unit 504 maps transmission symbols in a subframe with a symbol count M (M is a positive integer equal to or more than two) and a frequency subcarrier count N (N is a positive integer equal to or more than two) for each time/frequency domain defined by a symbol count P (P is an integer equal to or more than one and equal to less than M, for example, P=2 in this case) and a frequency subcarrier count Q (Q is an integer equal to or more than one and equal to or less than N, for example, Q=4 in this case).

The two types of scramble sequence multiplication methods as shown in FIGS. 15A and 15B differ in the amount by which a scramble sequence is cyclically shifted in the frequency subcarrier direction.

In the first scrambling method shown in FIG. 15A, the cyclic shift amount is four frequency subcarriers. In the second scrambling method shown in FIG. 15B, the cyclic shift amount is two frequency subcarriers. The respective scrambling methods are applied to different wireless communication apparatuses. If the wireless communication apparatuses are base stations, the scrambling methods with different cyclic shift amounts are applied to at least adjacent base stations. If the wireless communication apparatuses are wireless communication terminals, the scrambling methods with different cyclic shift amounts are applied to at least wireless communication terminals which perform wireless communication with adjacent base stations.

Although FIGS. 15A and 15B show the two types of scrambling methods, the present invention is not limited to the two types. It suffices to set cyclic shift amounts for the respective adjacent base stations and the respective wireless communication apparatuses which perform wireless communication with adjacent base stations so as to make the respective wireless communication apparatuses have different cyclic shift amounts.

In addition, in the methods shown in FIGS. 15A and 15B, it suffices to set cyclic shift amounts for the respective wireless communication apparatuses regardless of the time/frequency domain in which the mapping unit 504 spreads and maps one transmission symbol in a subframe.

As described above, according to the techniques shown in FIGS. 15A and 15B, when a plurality of wireless communication apparatuses simultaneously perform wireless communication in an environment in which they use the same frequency band, causing the respective wireless communication apparatuses to have different code sequences and respectively multiply spread transmission symbols by sequence elements by using different methods makes it possible to perform wireless communication while suppressing interference between adjacent base stations without degrading the effect obtained by spreading transmission symbols.

According to the embodiment described above, since the respective identical transmission symbols which are assigned to a time/frequency domain are multiplied by different codes, inter-cell interference can be randomized, thereby suppressing inter-cell interference.

It is possible to suppress inter-cell interference without degrading the effect obtained by spreading a transmission symbol.

Note that the techniques of the present invention which have been described in the embodiment of the present invention can be distributed as computer-executable programs by being stored in recoding media such as magnetic disks (flexible disks, hard disks, and the like), optical disks (CD-ROMs, DVDs, and the like), and semiconductor memories.

What is claimed is:

1. A wireless communication apparatus comprising:
a generator to generate a symbol;
an assigner to assign, to the symbol, a given number of units each formed of a time domain symbol and a frequency domain subcarrier in a frame which is formed of M (M is a positive integer) time domain symbols and N (N is a positive integer) frequency domain subcarriers and includes M×N units, and the given number of units including P (P is a positive integer not more than M) time domain symbols and Q (Q is a positive integer not more than N) frequency domain subcarriers; and
a code multiplier to multiply the symbol assigned to the given number of units by respective elements included in a code sequence, elements in the code sequence multiplied by the symbol in each time domain symbol being different from each other, wherein the code multiplier multiplies the symbol by the respective elements, while cyclically shifting the code sequence for a time domain symbol.

2. The apparatus according to claim 1, wherein the code multiplier multiplies the symbol assigned to the given number of units by the code sequence including M×Q elements corresponding to M time domain symbols and Q frequency domain subcarriers in the frame.

3. The apparatus according to claim 1, wherein the code multiplier multiplies the symbol assigned to the given number of units by the code sequence including P×N elements corresponding to P time domain symbols and N frequency domain subcarriers in the frame.

4. The apparatus according to claim 1, wherein the Q frequency domain subcarriers are continuous frequency domain subcarriers.

5. A wireless communication terminal for communicating with a base station, comprising:
a generator to generate a symbol;
a code multiplier to multiply, in order to generate transmission symbols, the symbol by a code sequence including a plurality of elements, the transmission symbols being generated corresponding to the plurality of respective elements of the code sequence, the code sequence being cyclically shifted by a cyclic shift amount, the cyclic shift amount varying with a time domain, the cyclic shift amount depending on the base station; and
a transmitter to transmit the transmission symbols.

6. A method applied to a wireless communication terminal for communicating with a base station, the method comprising:
generating, at a generator at the wireless communication terminal, a symbol;
multiplying, at a multiplier at the wireless communication terminal, in order to generate transmission symbols, the symbol by a code sequence including a plurality of elements to generate transmission symbols corresponding to the plurality of respective elements of the code sequence, the code sequence being cyclically shifted by a cyclic shift amount, the cyclic shift amount varying with a time domain, the cyclic shift amount depending on the base station; and
transmitting, from a transmitter at the wireless communication terminal, the transmission symbols.

7. A wireless communication terminal for communicating with a base station, comprising:
a generator to generate transmission symbols, the transmission symbols being generated by multiplying a symbol by a code sequence including a plurality of elements to generate the transmission symbols corresponding to the plurality of respective elements of the code sequence, the code sequence being cyclically shifted by a cyclic shift amount, the cyclic shift amount varying with a time domain, the cyclic shift amount depending on the base station; and
a transmitter to transmit the transmission symbols.

8. The terminal according to claim 5, further comprising an antenna to transmit the transmission symbols.

9. The terminal according to claim 7, further comprising an antenna to transmit the transmission symbols.

10. A method applied to a wireless communication terminal for communicating with a base station, the method comprising:
generating, at a generator at the wireless communication terminal, transmission symbols, the transmission symbols being generated by sequentially multiplying a symbol by a plurality of elements included in a code sequence, the code sequence being cyclically shifted by a cyclic shift amount, the cyclic shift amount varying with a time domain, the cyclic shift amount depending on the base station; and
transmitting, from a transmitter at the wireless communication terminal, the transmission symbols.

11. A wireless communication terminal for communicating with a base station, comprising:
a generator to generate a symbol;
a code multiplying unit configured to multiply the symbol by a code sequence including a plurality of elements to generate a transmission symbol, the code sequence being cyclically shifted by a given number of elements, the given number of elements varying with a time domain, the given number of elements depending on the base station; and a transmission unit configured to transmit the transmission symbol mapped on frequency subcarriers in the time domain.

12. The terminal according to claim 11, further comprising an antenna to transmit the transmission symbol.

13. A method applied to a wireless communication terminal for communicating with a base station, the method comprising:

generating, at a generator at the wireless communication terminal, a symbol;

multiplying, at a multiplier at the wireless communication terminal, the symbol by a code sequence including a plurality of elements to generate a transmission symbol, the code sequence being cyclically shifted by a given number of elements, the given number of elements varying with a time domain, the given number of elements depending on the base station; and transmitting, from a transmitter at the wireless communication terminal, the transmission symbol mapped on frequency subcarriers in the time domain.

* * * * *